United States Patent
Kikuchi

(10) Patent No.: US 8,858,080 B2
(45) Date of Patent: Oct. 14, 2014

(54) LINEAR MOTION GUIDE UNIT USING BALLS

(71) Applicant: Nippon Thompson Co., Ltd., Tokyo (JP)

(72) Inventor: Shunsuke Kikuchi, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/661,658

(22) Filed: Oct. 26, 2012

(65) Prior Publication Data

US 2013/0108194 A1    May 2, 2013

(30) Foreign Application Priority Data

Oct. 28, 2011 (JP) ................................ 2011-236761

(51) Int. Cl.
*F16C 33/10* (2006.01)
*F16C 29/06* (2006.01)
*F16C 33/66* (2006.01)

(52) U.S. Cl.
CPC ......... *F16C 29/0609* (2013.01); *F16C 33/6648* (2013.01); *F16C 33/6651* (2013.01); *F16C 29/0657* (2013.01)
USPC .............................................. 384/13; 384/43

(58) Field of Classification Search
CPC ............. F16C 29/0609; F16C 33/6611; F16C 33/6618; F16C 33/6648; F16C 33/6655; F16C 29/0602; F16C 29/06; F16C 29/065

USPC ..................................... 384/13, 43–45, 49, 50
See application file for complete search history.

(56) References Cited

U.S. PATENT DOCUMENTS

| | | | | |
|---|---|---|---|---|
| 6,024,490 | A | * | 2/2000 | Shirai ............................. 384/13 |
| 7,534,042 | B2 | * | 5/2009 | Kuwabara ........................ 384/13 |
| 7,780,356 | B2 | * | 8/2010 | Kuwabara et al. .............. 384/13 |
| 7,862,234 | B2 | * | 1/2011 | Kuwabara et al. .............. 384/44 |
| 7,927,016 | B2 | * | 4/2011 | Kuwabara ........................ 384/13 |

FOREIGN PATENT DOCUMENTS

| | | |
|---|---|---|
| JP | 10-078032 | 3/1998 |
| JP | 2001-082469 | 3/2001 |
| JP | 2006-038195 | 2/2006 |
| JP | 2007-100951 | 4/2007 |
| JP | 2008-082433 | 4/2008 |
| JP | 2009-063059 | 3/2009 |
| JP | 2009-068611 | 4/2009 |

* cited by examiner

*Primary Examiner* — James Pilkington
(74) *Attorney, Agent, or Firm* — Browdy and Neimark, PLLC

(57) ABSTRACT

A porous compact impregnated with lubricant fits into an end cap in a fashion exposed in part to a turnaround passage to apply the lubricant around balls while the balls roll through the turnaround passage. The porous compact is placed in a concavity in an end cap major part and a slot rounded at opposite ends thereof is formed in an outside curved portion of the turnaround passage to communicate the concavity with the turnaround passage. An applicator nose of the porous compact is exposed to the turnaround passage through the slot. The balls while being guided along edges of the slot come into rolling-contact with the exposed surface of the porous compact to be coated with the lubricant.

9 Claims, 13 Drawing Sheets

LINEAR MOTION GUIDE UNIT USING BALLS

FIELD OF THE INVENTION

The present invention relates to a linear motion guide unit comprised of an elongated guide rail and a slider designed to move on the elongated guide rail relatively to the guide rail through a plurality of rolling elements (balls).

BACKGROUND OF THE INVENTION

The linear motion guide units have been extensively applied in recent years between relatively sliding parts for linear reciprocating mechanism used in increased industrial fields including machine tools, various assembling machines, conveyors, and so on. With the prior linear motion guide units of the sort of roller bearings, the lubricating members are installed in the end caps at the opposite ends of the slider in the traveling direction of the slider to apply lubricant around the rolling elements while rolling through the turnaround passages in the end caps, thereby realizing virtual maintenance-free operation for lubrication.

One of prior linear motion guide units lubricated with any lubricant-impregnated polymers is disclosed in Japanese Laid-Open Patent Application No. H10-78 032, in which an end cap has a curved passage of a looped circuit through which rolling elements circulate and an inside wall surface of the curved passage is built in part of a return guide constituted with a skeleton for reinforcement and a lubricant impregnated polymers. The return guide fits into a semi-circular recess cut in the backside of the end cap. The return guide constructed as stated just earlier, however, poses a challenge that it is tougher to contain or preserve enough amount of lubricant as the proportion of the skeleton for reinforcement gets higher relative to the lubricant impregnated polymers.

In Japanese Laid-Open Patent Application No. 2001-82 469, there is disclosed a linear motion guide unit in which a return passage in the slider is made of sintered resinous material of porous or open-cellular construction. A through-hole to define the return passage in the slider is constituted with a tubular member of porous compact impregnated with lubricant to apply the lubricant around the rolling elements while running through there. Nevertheless, this prior linear motion guide unit, as in need of making the through-hole inside the return passage large in diameter, isn't ready for the miniature or downsized linear motion guide units.

A linear motion guide unit in which application of lubricant around the rolling elements is done in the turnaround passage has been already known and disclosed, for example in Japanese Laid-Open Patent Application No. 2007-100, 951. With the prior linear motion guide unit, the turnaround passage in the end cap has the wall surface constituted in part with a porous compact impregnated with lubricant to expose an applicator surface of the porous compact to apply the lubricant around the rolling elements while rolling contact with the porous compact. However, such construction as stated earlier could be ready for only relatively large type of the linear motion guide unit.

In Japanese Laid-Open Patent Application No. 2008-82 433, there is disclosed the linear motion guide unit in which application of lubricant around the rolling elements is done at the turnaround passage to make the lubrication system simpler than ever in construction, along with maintenance-free for steady and positive oil lubrication. With the prior linear motion guide unit constructed as stated earlier, a porous compact impregnated with lubricant is placed in the end cap in such a way as to expose an applicator surface of the porous compact to the turnaround passage. Thus, the porous compact makes contact with the rolling elements running through the turnaround passage to supply the lubricant around the rolling elements.

A slider in the linear motion guide unit to ensure the smooth rolling and positive lubrication of the rolling elements is known and disclosed, for example in Japanese Laid-Open Patent Application No. 2009-63 059. With the prior slider as recited above, a porous compact impregnated with lubricant fits in the end cap to expose an applicator surface thereof to a curved surface of the turnaround passage to apply the lubricant around the rolling elements while coming into rolling contact with the applicator surface. The construction as recited earlier could be ready for especially rolling elements (rollers).

In Japanese Laid-Open Patent Application No. 2009-68 611, there is disclosed a slider which can ensure the smooth rolling and positive lubrication of the rolling elements even though produced at low costs without strict dimensional control. With the prior slider, porous compacts impregnated with lubricant are exposed to the turnaround passages in the end caps in such a fashion that their applicator surfaces intersect with the outside curved halves of a pair of the turnaround passages to come into touch with the rolling elements to thereby apply lubricant around the rolling elements. The construction as recited earlier could be ready for especially roller rolling elements.

Other linear motion guide unit in which balls are selected for the rolling elements is known and disclosed, for example in Japanese Laid-Open Patent Application No. 2006-38 195. With the prior linear motion guide unit, the cylindrical slider is composed of a carriage provided therein with a lubricant reservoir, and end caps fastened to the opposite ends of the carriage and provided therein with lubricant applicators. The rolling elements are lubricated inside the turnaround passages in the end caps.

Recently, the linear motion guide units recited earlier have been increasingly needed to be maintenance-free for lubrication over a long-lasting operation. Nevertheless, the linear motion guide units of miniature type, because of being much downsized in their contour dimensions, are really impracticable to realize maintenance-free for lubrication due to lack of space for the provision of a lubricating member. When an attempt was made to apply the conventional sleeve or tube of a lubricating member to the miniature linear motion guide units, the lubricating member inevitably would get too small in thickness to reserve therein sufficient lubricant enough to keep the linear motion guide units against any lubrication failure such as binding or seizure between parts. Contrary to the above, the lubricating member capable of reserving ample amount of lubricant is required making the lengthwise bore for the return passage larger in the carriage in the slider. This poses other challenges in that the carriage degrades in rigidity or stiffness because of the large bore and at the same time material around the large bore may become very lean in thickness.

Meanwhile, installation of the lubricating members in the end caps has been heretofore employed in the roller-type linear motion guide units. A new attempt has been done to apply the installation of the lubricating members in the end caps to the ball-type linear motion guide unit, especially the miniature linear motion guide unit using a guide rail of not more than 3 mm wide and ball rolling elements of not more than 1 mm in diameter. Further, the miniature linear motion guide unit with the lubricating members installed in the end

SUMMARY OF THE INVENTION

The present invention has for its primary object to overcome the major challenge as stated earlier, and to accomplish the virtual maintenance-free operation for lubrication in a miniature linear motion guide unit, especially in a ball-type miniature linear motion guide unit not ready for the conventional lubricating members expected to realize the maintenance-free working for lubrication. More particularly, the present invention provides a linear motion guide unit in which a porous compact impregnated with lubricant are installed inside end caps fastened to opposite ends of a slider in sliding direction of the slider, and balls while rolling through turnaround passages in the end caps are applied with, or coated steadily with, the lubricant with accompanying maintenance-free lubrication over a long-lasting period.

The present invention is concerned with a linear motion guide unit comprising: an elongated guide rail having on both sides thereof first raceway grooves extending lengthwise of the guide rail, and a slider that fits over or conforms to the guide rail to move lengthwise of the elongated guide rail in a sliding manner, the slider being composed of a carriage and end caps, the carriage having second raceway grooves extending in opposition to the first raceway grooves on the guide rail to provide load-carrying races between the first and second raceway grooves and return passages extending along the load-carrying races, the end caps being fastened on lengthwise opposed end surfaces of the carriage, one to each end surface, and provided therein with turnaround passages extending with curvature to connect the load-carrying races with the return passages, and the slider being further composed of a plurality of ball rolling elements, which are allowed to roll through circulating circuits made up of the load-carrying races, return passages and a pair of the turnaround passages, and porous compacts impregnated with lubricant and stowed in concavities recessed below end surfaces of the end caps in a sliding direction of the slider, and wherein the turnaround passages on outside curved wall portions thereof have a slot connecting the concavities in the end caps to the turnaround passages, the slots being each elongated in a rolling direction of the ball and rounded at lengthwise opposite ends thereof, each of the porous compacts having an applicator nose extending through the respective slot to provide end surfaces exposed to the turnaround passages, and the balls while rolling through the turnaround passages being guided along the slots to make rolling contact with the exposed surfaces of the porous compacts to be applied with the lubricant impregnated in the porous compacts.

The end caps are each composed of an end cap major part defining the outside curved wall portions of the turnaround passages and a spacer part defining an inside curved wall portion of the turnaround passages, the end cap major part having a concavity in which the porous compact is installed and the slots into which the applicator noses of the porous compact fit. Moreover, the exposed surfaces of the applicator noses are each set back below the opposite ends of the respective slot and edges which extend in parallel with each other to connect the opposite ends of the slots to each other, so that spherical surfaces of the balls, while rolling along the outside curved wall portions of the turnaround passages protrude in part through an interval between the edges of the respective slot to come into rolling contact with the exposed surfaces to apply the lubricant around the spherical surfaces of the balls. Pockets serving as oil reservoirs are each defined with the combination of the exposed surface of the applicator nose and a wall surface of the slot at vicinities of the opposite ends of the slot through which the porous compact is exposed to the turnaround passage.

The balls, while protruding in part through the interval between the edges of the respective slot, come into at least one-point contact with the contact areas of the exposed surface midway between the opposite ends of the respective slot. Moreover, the exposed surfaces of the applicator noses of the porous compact extend aslant with respect to the rolling direction of the balls, thereby tilting in the openings to more approach the ends of the carriage on the side of the return passages than on the side of the load-carrying races.

According to the present invention, there is provided a linear motion guide unit in which a plurality of protrusions are raised above a front and/or a rear surface of the porous compact in the moving direction of the slider. These protrusions, after the porous compact has been fitted and fastened in the concavity in the end cap major part, are squeezed inside the concavity to suffer deformation, thereby keeping the porous compact against rattling and/or straying relatively to the end cap major part. Moreover, the porous compact fits into the concavity in the end cap, exposing itself to at least the top surface of the guide rail.

According to the present invention, there is provided a linear motion guide unit in which the slider fits over or conforms to the guide rail. The guide rail has a width of 6 mm and is rectangular in cross-section, the balls have a diameter of 1.0 mm or less and the assembled guide unit has an overall height of 4.5 mm or less. The porous compact is made of finely powdery ultrahigh molecular weight synthetic resin of any one of polyethylene and polypropylene. Moreover, the finely powdery ultrahigh molecular weight synthetic resin is compacted under pressure together with the application of heat, the resulting sintered resinous member having open-porous texture in which pores are open to each other through interstices among resinous particles, and wherein the lubricant fills in the pores.

With the linear motion guide unit constructed as stated earlier, the end cap major part having the concavity stowed with the lubricant-impregnated porous compact has the slots opened in the outside curved wall portions of the turnaround passages to communicate the concavity to the turnaround passages. The applicator noses of the porous compact fit into the slots to expose their leading edges to the turnaround passages and apply or coat the balls with lubricant, thereby making sure of smooth rolling of the balls while rolling through the turnaround passages. The construction as stated just above is most befitted for the linear motion guide units of miniature type in which the carriage of the slider has less space in cross-sectional dimension to make it possible to realize maintenance-free condition for lubrication. As there is no need to enlarge the caliber of the return passage for the provision of any lubricating members as opposed to the conventional constructions, it is easier to keep the slider more resistant against any external load. The leading edges of the applicator noses of the lubricant-impregnated porous compact exposed to the turnaround passages are set back below the openings of the slots which communicate the concavity receiving the porous compact to the turnaround passages across the outside curved wall portions of the turnaround passages, so that no ball while rolling through the turnaround passages gets caught by the exposed surfaces of the applicator noses. Meanwhile, the balls sometimes would suffer any centrifugal force occurring due to inertial force at the time the moving direction of the balls changes from the straight movement in the load races or return passages to curvilinear movement in the turnaround passages and/or any external force caused by other balls which wobble in the turnaround passages at the time the slider reverses in travelling or moving direction. According to the present invention, the balls roll through the turnaround passages while being guided along the edges of the slots, and therefore the balls are allowed to roll orderly through the turnaround passages and harder to get influence of variation in dimension from product to product even under such adverse operating conditions in which the balls are subjected to either the centrifugal force and/or the external impact as stated just earlier. Moreover, the balls while rolling across the openings of the slots are applied with the lubricant retained in the oil reservoirs which are each defined with the combination of the exposed surfaces on the leading edges of the applicator noses and wall surfaces of the slots.

The leading surfaces of the porous compact exposed to the turnaround passages are made as small in size as permitted to get rid of any vain or needless consumption of lubricant, so that the linear motion guide unit of the present invention is better for the miniature type which cannot afford to reserve a lot of lubricant. Moreover, the exposed surfaces of the applicator noses of the porous compact are set back or retreated below the edges around the slots in the end cap major part, so that the oil reservoirs are formed by the combination of the exposed surfaces of the porous compact and the wall surfaces around the slots to define the openings. The balls while rolling across the slots, as coming into rolling contact with the exposed surfaces of the porous compact, are steadily coated with the lubricant from the oil reservoirs. With the linear motion guide unit of the present invention, further, some protrusions are raised above the front and/or the rear surface of the porous compact in the moving direction of the slider. These protrusions, after the porous compact has been fitted and fastened in the concavity in the end cap major part, are squeezed inside the concavity by tightening the closure plate against the end cap major part to suffer deformation, thereby keeping the porous compact against rattling and/or straying in the travelling direction of the slider, making certain of positive rolling-contact of the balls against the exposed surfaces of the porous compact to carry out steady application of the lubricant around the balls.

The slots to make the openings in the turnaround passages are defined with the rounded opposite ends and the edges extending in parallel with each other between the rounded opposite ends. Thus, the balls may transfer smoothly from the wall surfaces of the outside curved wall portions of the turnaround passages to the openings and roll smoothly across the slots and the exposed surfaces while guided by the opposite ends and the edges of the slots over a distance in the rolling direction of the balls enough to make sure of steady rolling-contact with the porous compact. Thus, the slider can move on the guide rail through the balls. The applicator noses of the porous compact are set in the slots in such a way that the balls while rolling past the slots in the turnaround passages guided by the edges of the slots come into rolling-contact with exposed surfaces of the porous compact at only the middle of each slot. Thus, the balls can roll across the slots without get obstructed with the exposed surfaces of the porous compact. The exposed surfaces of the applicator noses of the porous compact extend aslant with respect to the rolling direction of the balls so as to tilt in the openings to more approach the ends of the carriage on the side of the return passages than on the side in the load-carrying races. Although the openings of the slots are laid nearer or closer to the return passages with respect to the middle of the turnaround passage, the inclination of the exposed surfaces helps make the rolling-contact of the balls with the exposed surfaces nearby the substantially middle of the opening, making sure of the contact area of the balls with the exposed surfaces. Thus, the porous compact may be set easily within the area where the balls invariably come into contact with the exposed surfaces, even if there is any variation in dimension from product to product. The porous compact fits into the concavity in the end cap with exposing itself to at least the top surface of the guide rail, so that it is easy to increase the volume of the porous compact to make it possible to increase an amount of lubricant retained in the pores and interstices in the porous compact.

BRIEF DESCRIPTION OF THE DRAWINGS

FIG. 23(A) is a sectional view showing the exposed surface of the porous compact disposed on a slant in the turnaround passage and FIG. 23(B) is a sectional view taken on the plane of line 23(B)-23(B) of FIG. 23(A).

FIG. 24(A) is a sectional view showing the exposed surface of the porous compact disposed level in the turnaround passage and FIG. 24(B) is a sectional view taken on the plane of line 24(B)-24(B) of FIG. 24(A).

FIG. 25(A) is a sectional view showing the exposed surface of the porous compact disposed on a raised level in the turnaround passage and FIG. 25(B) is a sectional view taken on the plane of line 25(B)-25(B) of FIG. 25(A).

FIG. 26(A) is a sectional view showing the exposed surface of the porous compact made concave in the turnaround passage and FIG. 26(B) is a sectional view taken on the plane of line 26(B)-26(B) of FIG. 26(A), and FIG. 27 parallels the view of FIG. 23 to explain another version of the relationship between the end cap, porous compact and ball.

DETAILED DESCRIPTION OF THE PREFERRED EMBODIMENTS

Figure 17:
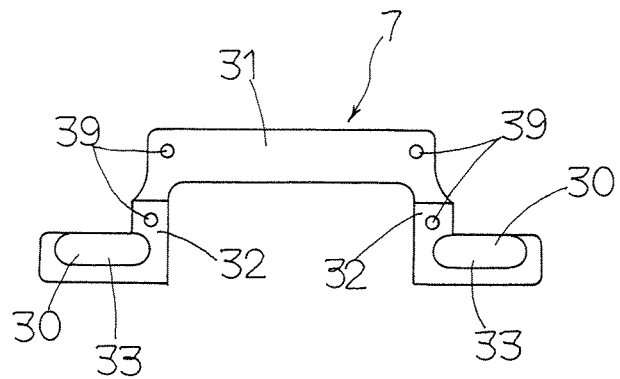
FIG. 17 is a view in front elevation of the porous compact to be installed inside the end cap major part.

The linear motion guide unit of the present invention is befitted for use in any relatively sliding components in machinery as diverse as semiconductor fabricating equipment, precision machines, measurement/inspection instruments, medical instruments, machine tools, robotic machines, various assembling machines, conveyers, micromachines, and so on. A preferred embodiment of the linear motion guide unit constructed according to the present invention will be described in detail by reference to the drawings. The linear motion guide unit according to the present invention is mainly composed of an elongated guide rail 1 having widthwise opposing sides 60 on which raceway grooves (first raceway grooves) 11 are provided to extend lengthwise of the guide rail 1, one to each side, and a slider 2 that fits over or conforms to the guide rail 1 to move or travel in a sliding manner lengthwise of the guide rail 1. Moreover, the guide rail 1 has some holes 18 extending from a top surface 49 across a vertical thickness of the guide rail 1. The holes 18 are used to fasten the guide rail 1 to any stationary bed including a machine bed, mounting base, and so on. With the linear motion guide unit of the present invention, the rolling elements are balls 10. The slider 2 is chiefly composed of a carriage 3 having raceway grooves 12 (second raceway grooves) lying in opposition to the raceway grooves 11 on the guide rail 1 to define a pair of load-carrying races 17 opposing each other across the guide rail and further having a pair of return passages 20 extending in parallel with and along by the load-carrying races 17, end caps 4 mounted on lengthwise opposite ends 46 of the carriage 3, one to each end, and provided therein with turnaround passages 15 extending in an arc to connect the load-carrying races 17 with the return passages 20, and a plurality of rolling elements (balls) 10 rolling through circulating circuits 45 made up of the load-carrying races 17, return passages 20 and paired turnaround passages 15. On the carriage 3 of the slider 2, moreover, there are provided some threaded holes 19 that are used to fasten the slider 2 to any component including a workpiece, a variety of instruments, and so on. The end caps 4 are each composed of an end cap major part 5 having outside curved wall portions or halves 28 of the turnaround passages 15 open to the carriage 3 and a concavity 16 recessed below an end surface 48 opposite to the carriage 3, and a spacer part 6 having inside curved wall portions or halves 29 of the turnaround passages 15 on the side thereof opposite to the carriage 3 and nested in a recess 37 which is made in the end cap major part 5 on the side thereof mating with the carriage 3. The end caps 4 are each completed by complementary-fit of the end cap major part 5 with the spacer part 6. The spacers 6 are each constituted with sidewise opposite lugs 51 having the inside curved wall portions or halves 29 of the turnaround passages 15 thereon and a middle major portion 50 joining the sidewise opposite lugs 51 together. The end cap major part 5 has two raised portions 38 having a semi-circular cross section and the spacer part 6 has locating depressions 55 into which the raised portions 38 fit to locate precisely the spacer part 6 relative to the end cap major part 5. A porous compact 7 fits into the concavity 16 in the end cap 4 in a way exposing itself to both the top surface 49 and the sides 60 of the guide rail 1. The porous compact 7 has four convex portions 39 raised above a surface to be mated with the end cap major part 5 (FIG. 17). The turnaround passages 15 are completed after the outside curved wall portions or halves 28 and the inside curved wall portions or halves 29 have come into mating contact with one another.

With the linear motion guide unit constructed as stated earlier, the carriage 3 is constituted with a major middle portion 13 lying just above the guide rail 1 and a pair of side bulges 14 spreading downwards to stride across the guide rail 1 and having the raceway grooves 12 and the return passages 20 both of which extend lengthwise of the carriage 3. The end cap major part 5 is constituted with a major portion 35 equivalent to the major middle portion 13 of the carriage 3 and bulges 36 equivalent to the side bulges 14 of the carriage 3. The sidewise opposite bulges 36 of the end cap major part 5 have the outside curved wall portions 28 of the turnaround passages 15 to constitute the circulating circuits 45 to allow the balls 10 to roll through. The turnaround passages 15 extend in an arc to connect the load-carrying races 17 with the return passages 20. Across section of the turnaround passage 15 taken on the plane normal to the rolling direction of the ball is a substantially exact circle of a diametric dimension larger than a diameter of the ball 10. Moreover, the spacer part 6 is constituted with a major portion 50 of the equivalent to the major portion 35 of the end cap major part 5 and the lugs 51 of the equivalent to the bulges 36 of the end cap major part 5. The spacer part 6 has the inside curved wall portions or halves 29. The porous compact 7, after being impregnated with lubricant, fits into the concavity 16 in the end cap major part 5. On an outward end 52 of the end cap major part 5 opposite to the carriage 3, the closure plate 8 is placed and tightened with fastening bolts 9 driven into bolt holes 21 to squeeze the porous compact 7 inside the concavity 16 of the end cap major part 5. All the carriage 3, spacer parts 6, end cap major parts 5 and the closure plates 8 are assembled into the slider 2 by means of the fastening bolts 9 which, after having extended through the bolt holes 21 in the closure plates 8, through-holes 22 in the end cap major parts 5 and lengthwise grooves 47 cut on the spacer parts 6, are tightened into threaded holes 23 in the carriage 3.

The linear motion guide unit of the present invention is largely befitted for balls 10 of 1.0 mm or less in diameter and the guide rail 1 of 5 mm or less in width. With an embodiment of the miniature linear motion guide unit, the guide rail 1 was 3 mm wide and less four times the diameter of the ball 10, and 2.6 mm in height. As an alternative, the guide rail 1 of wider construction was 6 mm or less in width and 2.8 mm in height. This miniature linear motion guide unit operated on maintenance-free condition with no need of oil grooves, grease nipples for lubricant in the slider 2. With the miniature linear motion guide unit, moreover, the side bulges of the carriage 3 each have a width of less than triple the diameter of the ball 10 and a height of 2.2 times the diameter of the balls 10.

Figure 18:
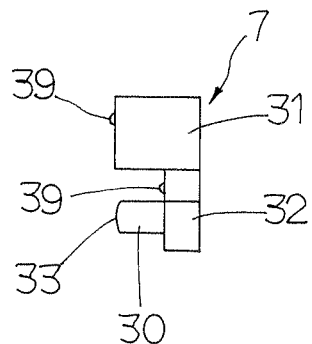
FIG. 18 is a view in side elevation of the porous compact of FIG. 17.
Figure 19:
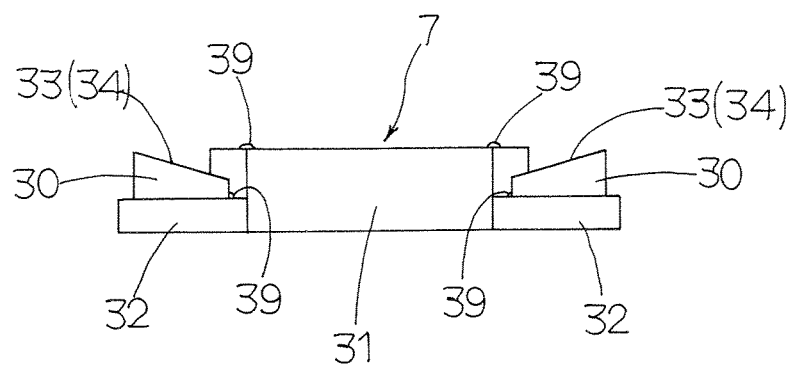
FIG. 19 is a bottom plan view of the porous compact of FIG. 17.
Figure 20:
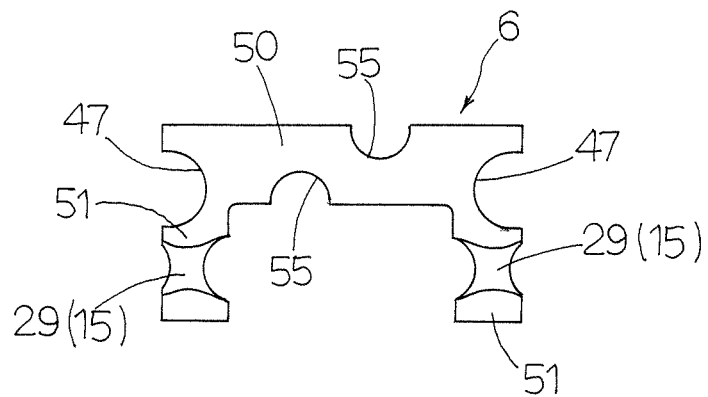
FIG. 20 is a view in front elevation of a spacer part for the end cap viewed from the end cap major part.
Figure 21:
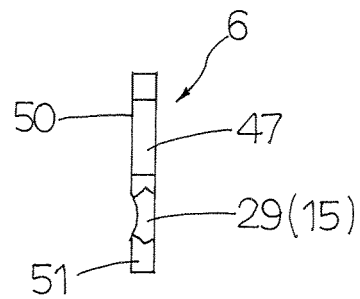
FIG. 21 is a view in side elevation of the spacer part of FIG. 20.
Figure 22:
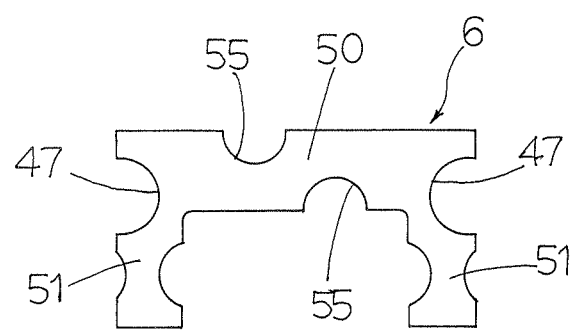
FIG. 22 is a view in rear elevation of the spacer part of FIG. 20 viewed from the carriage.
Figure 23:
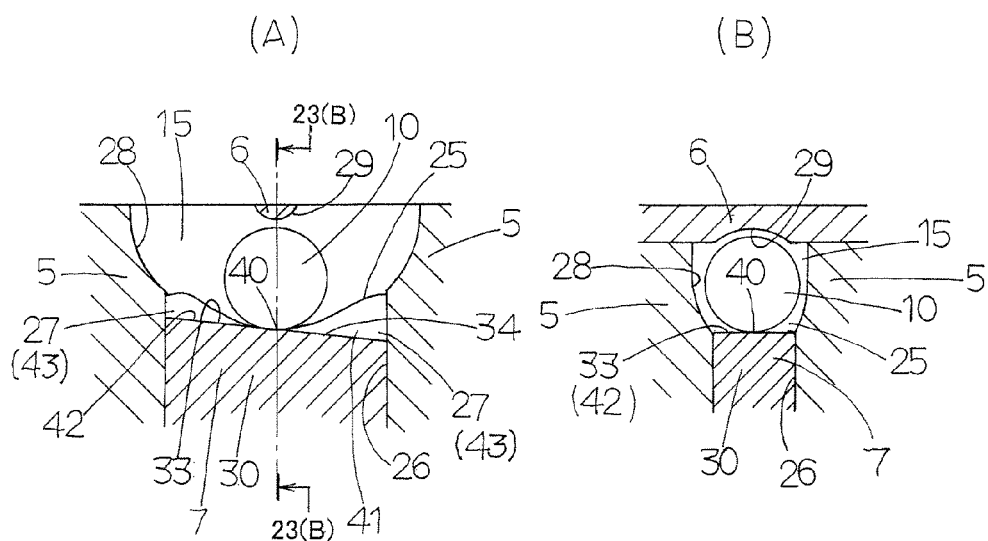
FIG. 23 parallels the view of FIG. 10 to explain a version of the relationship between the end cap, porous compact and ball.
Figure 24:
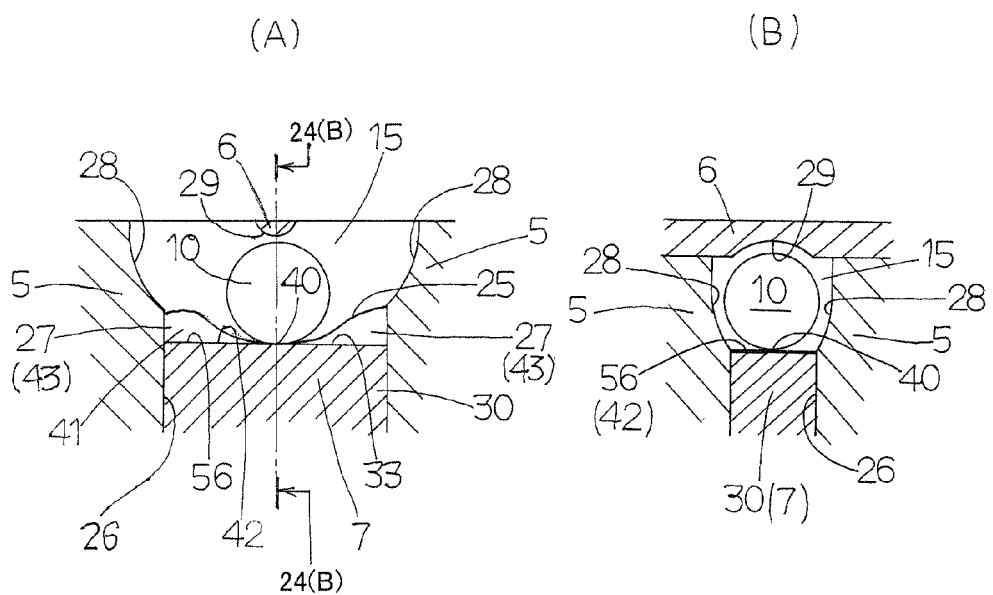
FIG. 24 parallels the view of FIG. 23 to explain another version of the relationship between the end cap, porous compact and ball.
Figure 25:
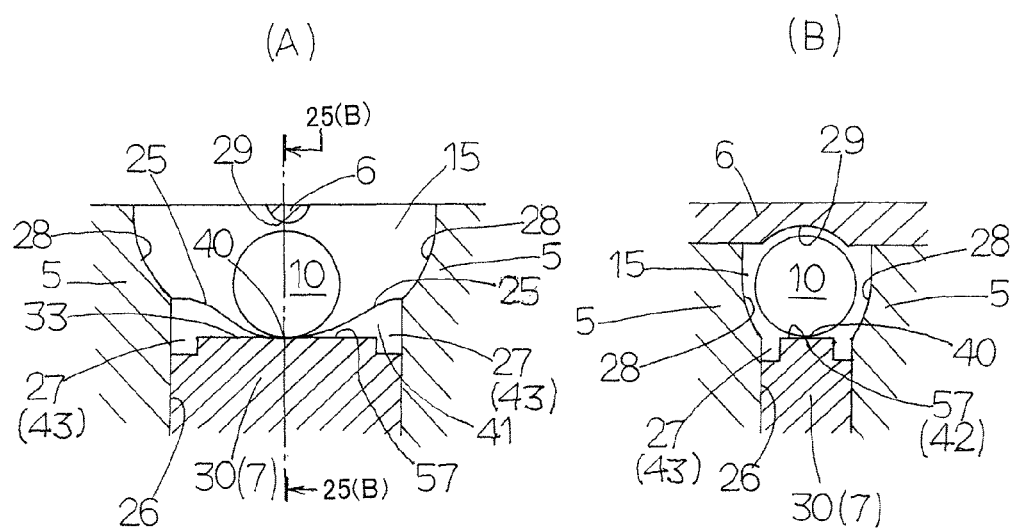
FIG. 25 parallels the view of FIG. 23 to explain a further another version of the relationship between the end cap, porous compact and ball.
Figure 26:
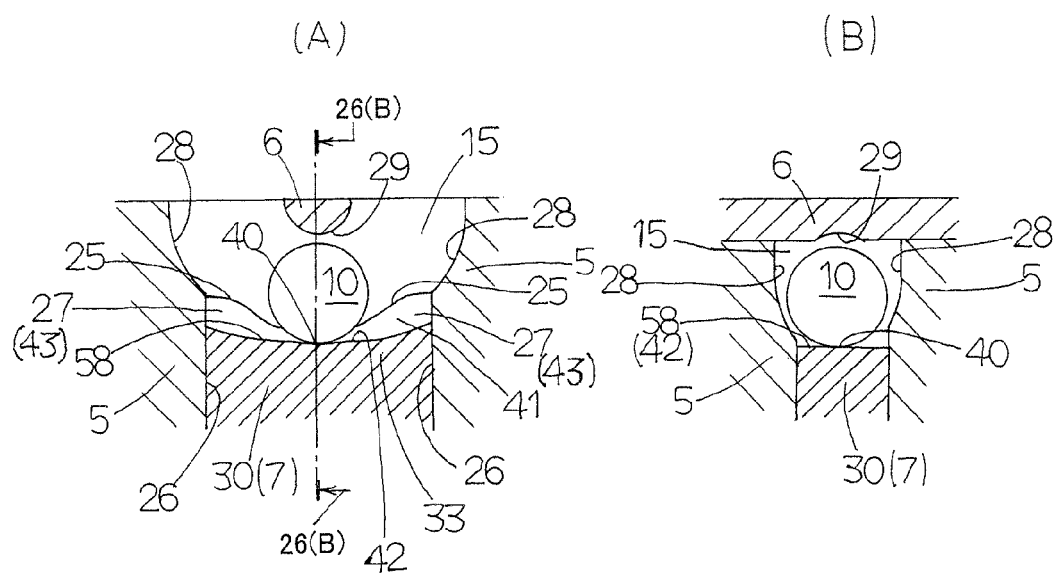
FIG. 26 parallels the view of FIG. 23 to explain another version of the relationship between the end cap, porous compact and ball.
Figure 27:
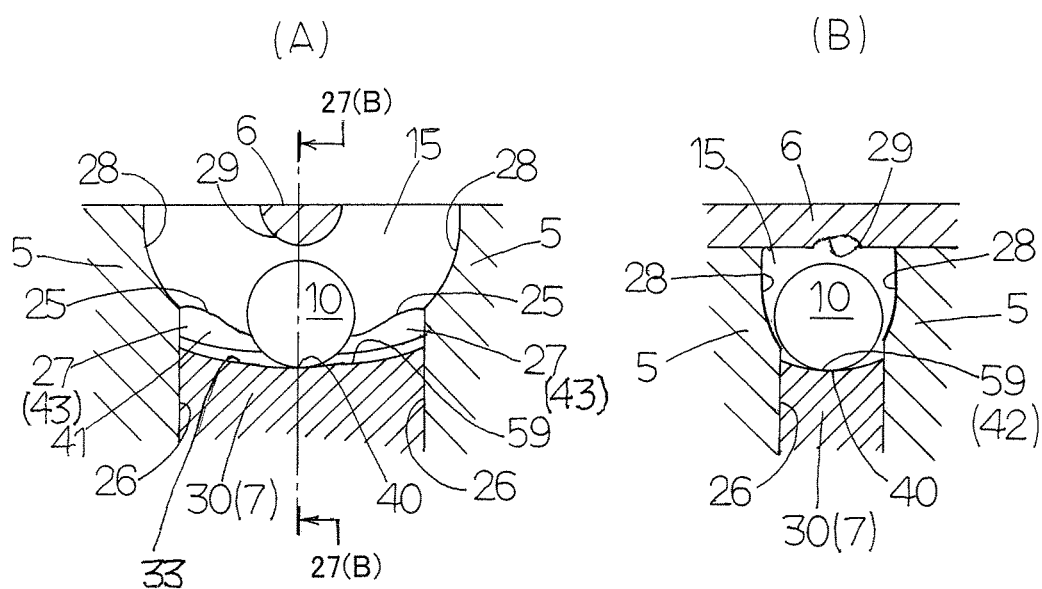
FIG. 27(A) is a sectional view showing the exposed surface of the porous compact made in a doughnut shape in the turnaround passage and FIG. 27(B) is a sectional view taken on the plane of line 27(B)-27(B) of FIG. 27(A).

With the linear motion guide unit constructed as stated earlier, the porous compact 7 stowed inside the concavity 16 in the end cap major part 5 and squeezed with the closure plate 8, unlike the conventional porous compact of sleeve style, can be lengthened in dimension in the traveling direction of the slider 2 to increase the volume of the porous compact 7. As a result, more amount of lubricant may be absorbed or retained in the porous compact 7 in favor of the maintenance-free application of lubricant over a prolonged period of service life. The closure plate 8 tightened against the carriage 3 is to keep in place the porous compact 7 so as not to rattle and/or stray in the sliding direction. The porous compact 7 is made of finely powdery ultrahigh molecular weight synthetic resin, which is first subjected to compacting and the resulting compact is subsequently sintered at elevated temperature. In the porous compact 7, the fine particles of the powdery synthetic resin partially coalesce with each other with leaving intercommunicating voids to provide open-porous or open-cellular texture whose pores or cells preserved among fine particles are open each other through interstices or channels. Lubricant is well absorbed and preserved in the pores or cells in the porous compact 7. Meanwhile, the preferred powdery synthetic resin may be selected from polyethylene or polypropylene. The porous compact 7, as shown in FIGS. 17 to 19, is composed of a reservoir section 31 filled with lubricant and stowed in the concavity 16 of the end cap major part 5 to conform closely the underneath of the major portion 35 of the end cap major part 5, connector sections 32 integral with the reservoir sections 31 and fitted in the concavity 16 inside the bulges 36 of the end cap major part 5, and applicator noses 30 extending integrally from the connector sections 32 to fit into slots 26 in the bulges 36 of the end cap major part 5. The reservoir section 31 is a massive block able to be impregnated with a plenty of lubricant, the connector sections 32 being flat pieces integral with the reservoir section 31, and the applicator noses 30 extend from the connector sections 32 to lead the lubricant into the turnaround passages 15. The applicator noses 30 are designed to fit into the slots 26 in the concavity 16. A cross-sectional contours of the applicator noses 30 or the slots 26 each have dimensions of, for example 1.3 mm long in widthwise direction of the slider corresponding to about 160% of the diameter of the ball, and 0.45 mm wide accounting for about 60% of the diameter of the ball. The applicator noses 30 or the slots 26, moreover, are rounded off at widthwise opposite ends thereof to have the radius of curvature of 0.225 mm. Exposed surfaces of the porous compact 7 are identical in shape in cross section thereof with applicator noses 30. The concavity 16 open to the side of the closure plate 8 is made different in depth between an area to fit over the reservoir section 31 and other areas to fit over the connector sections 32. The slots 26 in the end cap major part 5 are designed to fit over the applicator noses 30 of the porous compact 7. With the linear motion guide unit of the present invention, the reservoir section 31 of the porous component 7 has dimensions of, for example 4 mm in width, 0.72 mm in height and 1.17 mm in thickness.

Figure 11:
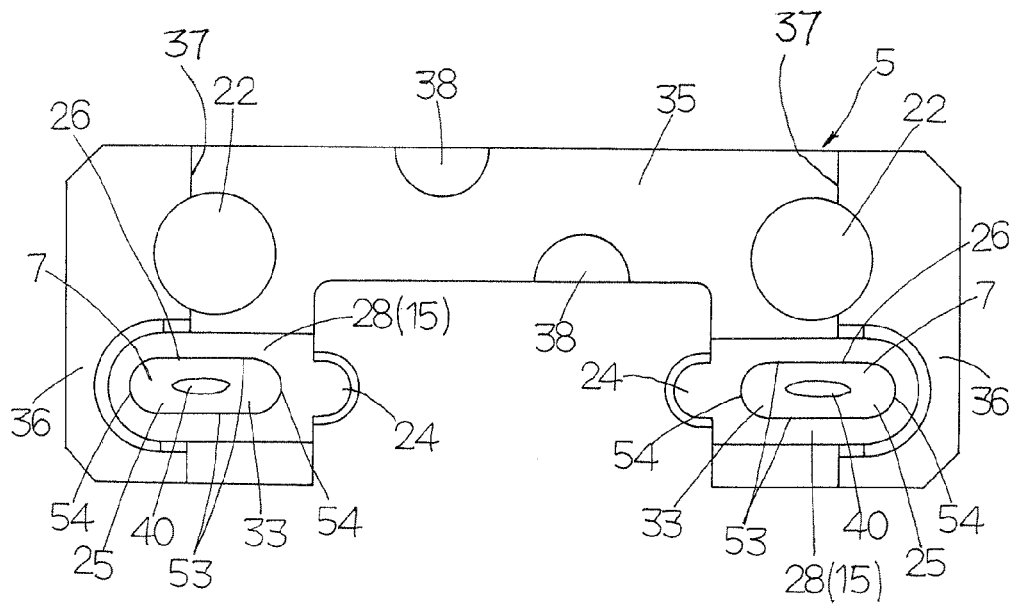
FIG. 11 is an illustration of the end cap major part viewed from the carriage to show the porous compact fit into the end cap major part, and an area along which the ball while rolling through the turnaround passage comes into rolling contact with an exposed surface of the porous compact out of the opening of the turnaround passage.
Figure 12:
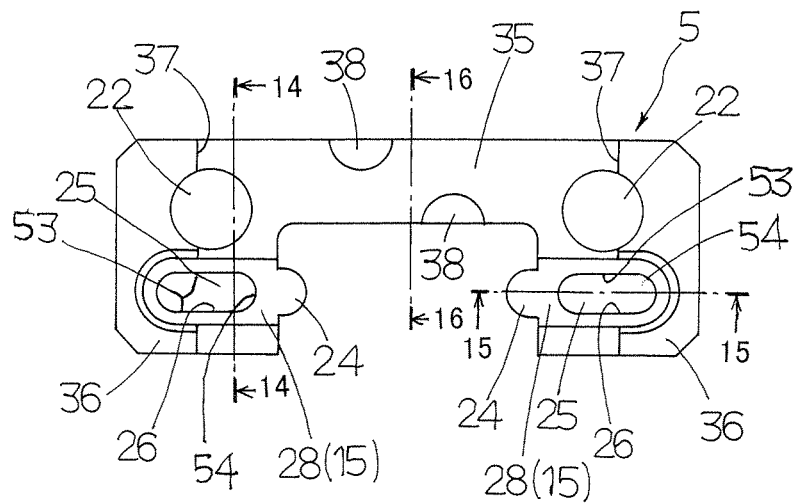
FIG. 12 is a view in rear elevation of the end cap major part viewed from the carriage.
Figure 13:
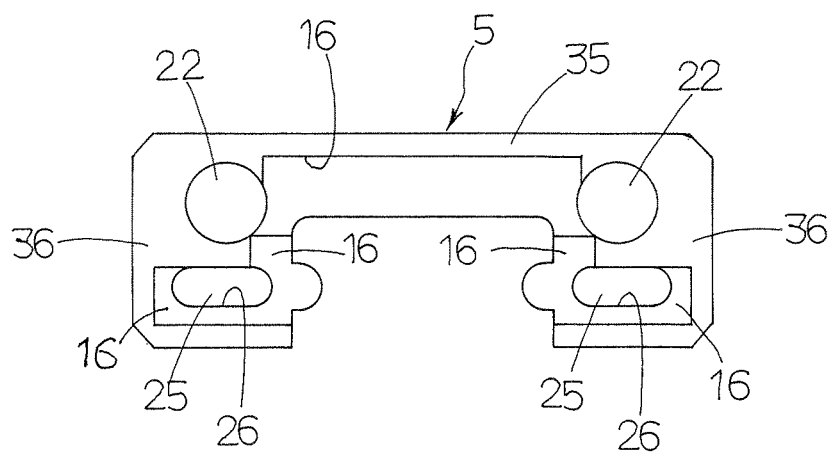
FIG. 13 is a view in front elevation of the end cap major part viewed from a closure plate lying opposite to the carriage across the end cap major part.
Figure 14:
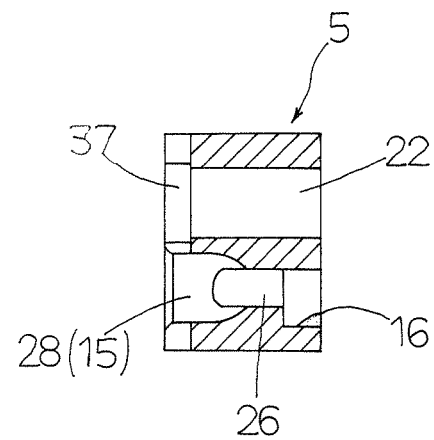
FIG. 14 is a view in section of the end cap major part taken on the plane of the line 14-14 of FIG. 12.
Figure 15:
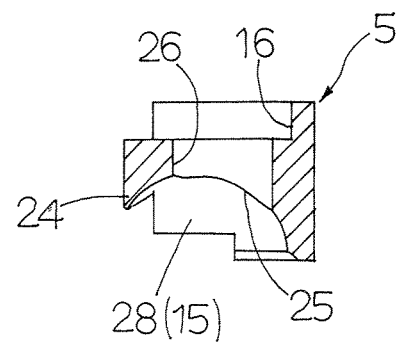
FIG. 15 is a view in section of the end cap major part taken on the plane of the line 15-15 of FIG. 12.
Figure 16:
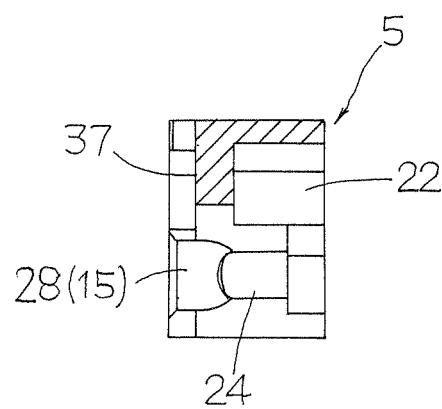
FIG. 16 is a view in section of the end cap major part taken on the plane of the line 16-16 of FIG. 12.

With the linear motion guide unit of the present invention, the concavity 16 in the end cap major part 5 leads to the turnaround passages 15 across the outside curved wall portions 28 of the turnaround passages 15 at openings 25 defined by the slots 26 of such contour that is long in the rolling direction of the balls and rounded off at opposite ends thereof. The porous compact 7 is placed in the concavity 16 in such that the applicator noses 30 are exposed through the openings 25 into the turnaround passages 15. Thus, the balls 10 while rolling through the turnaround passages 15 are urged centrifugally against edges 53 around the slots 26 to make rolling contact with the exposed surfaces 33 on leading edges 42 of the applicator noses 30 of the porous compact 7 and in doing so, the lubricant absorbed or retained in the porous compact 7 is applied around the balls 10. The slots 26 are each defined with the rounded ends 54 and a pair of edges 53 extending between the rounded ends 54 in parallel with each other and spaced away from each other by a distance less than the diameter of the ball 10. Thus, the slots 26 communicate the turnaround passages 15 with the concavity 16 in the end cap major part 5 open to the side of the closure plate 8. The surfaces 33 on leading edges 42 of the applicator noses 30 exposed to the turnaround passages 15 are each set back below the openings 25 rimmed with the edges 53 of the slots 26. More particularly, the edges 53 defining the slots 26 are flush with the wall surfaces of the outside curved portions of the turnaround passages 15 and therefore the exposed surfaces 33 of the porous compact 7 are placed to recede or sink below the wall surfaces of the outside curved portions of the turnaround passages 15. The exposed surfaces 33 are formed in the shape of oval, ellipse or elongated rectangle in conformity with the slots 26 in the end cap major part 5. While the balls 10 roll through along the outside curved portions 28 of the turnaround passages 15, the spherical surfaces of the balls 10 protrude in part through intervals between the edges 53 of the slots 26 to come into rolling contact with the exposed surfaces 33 at contact areas 40 lying midway between the lengthwise opposite ends of the slots 26 as shown in FIG. 11. The areas 40 where the balls 10 make contact with the exposed surfaces 33, when viewed in plan view, is positioned at a slant or is level with respect to the widthwise direction of the slider as will be stated later. As an alternative, the contact areas 40 may be made in an inside curved surface of a cylinder or an inside concaved surface of doughnut shape. Anywhere on the porous compact 7 other than the contact areas 40 on the exposed surfaces 33 may be made in any arbitrary contour unless it would interfere with the rolling movement of the balls 10 inside the turnaround passages 15. To this end, the porous compact 7 other than the contact areas 40 recedes in the end cap major part 5 from the exposed surfaces 33 towards the closure plate 8 in the sliding direction of the slider 2 and has any contour of convexity, trapezoid with slope sides, trapezoid with curved vertexes at opposite ends and trapezoid with convex or concave slopes. Pockets 43 serving as oil reservoirs 27 are defined with the combination of the exposed surfaces 33 on the leading edges 42 of the applicator noses 30 and wall surfaces 41 of the slots 26 at the vicinities of the opposite ends 54 of the slots 26 through which the porous compact 7 is exposed to the turnaround passages 15. Moreover, the balls 10 are allowed to roll while keeping rolling contact with the exposed surfaces 33 of the applicator noses 30 of the porous compact 7 at only at least one point lying between the edges 53 of the slots 26 and midway between the opposite ends 53 of the slots 26. The exposed surfaces 33 of the applicator noses 30 of the porous compact 7 in the turnaround passages 15 extend perpendicularly or aslant with respect to the rolling direction of the balls 10, thereby tilting in the openings 25 to more approach the ends 46 of the carriage 3 on the side of the return passages 20 than on the side in the load-carrying races 12.

With the linear motion guide unit of the present invention, the reservoir section 31 and the connector sections 32 of the porous compact 7 have a plurality of raised portions 39 on the front side of the porous compact 7 facing on the closure plate 8 and/or the rear side of the porous compact 7 facing on the end cap major part 5. The raised portions 39 are formed in, for example a hemisphere shape of 0.08 mm in radius, two for each section, to make abutment against inside walls of the concavity 16 in the end cap major part 5. The raised portions 39 on the reservoir section 31 are placed widthwise symmetry, for example 1.72 mm away from the midline of the reservoir section. These raised portions 39, after the porous compact 7 has fitted and fastened in the concavity 16 in the end cap major part 5, are squeezed against the inside walls of the concavity 16 by tightening of the fastening bolts 9 to suffer deformation, thereby keeping the porous compact 7 against rattling and/or straying in the sliding direction so as to make certain of positive rolling contact of the balls 10 against the exposed surfaces 33 of the porous compact 7. The raised portions 39 on the porous compact 7 are more especially provided both on the reservoir section 31 at locations near the connector sections 32 and on the connector sections 32 at locations placed in widthwise symmetry to come into upper sides of the wall surfaces of the inside curved portions 29 of the turnaround passages 15. The porous compacts 7 are each held firmly inside the concavity 16 in the end cap major part 5 by tightening of the fastening bolts 9 in the closure plate 8 against the end of the slider 2 to squeeze the porous compact 7 in the end cap 4. Thus, when the porous compact 7 is squeezed into the concavity 16 in the end cap major part 5 by a flat area on the closure plate 8, the raised portions 39 on the porous compact 7 undergo deformation to prevent the porous compact 7 from rattling and/or straying in the sliding direction so as to keep the porous compact 7 against the overall abnormal deformation to ensure the smooth application of the lubricant.

The porous compact 7 stowed in the concavity 16 in the end cap major part 5 is exposed to the top surface 49 of the guide rail 1. In the outside curved wall portions 28 of the turnaround passages 15 in the end cap major parts 5, there are provided the openings 25 to communicate the concavity 16 to the turnaround passages 15. The applicator noses 30 of the porous compact 7 fit into the openings 25 in such a way the leading edges 42 of the applicator noses 30 are exposed at their surfaces 33 to the turnaround passages 15. The rolls 10 roll through the turnaround passages 15 while making rolling contact with the edges 53 of the slots 26 which define the openings 25, and in doing so come into rolling contact with at least the exposed surfaces 33 on the leading edges 42 of the applicator noses 30 of the porous compact 7 at middle areas of the slots 26. The balls 10 while rolling through with keeping rolling contact with the exposed surfaces 33 are applied with the lubricant impregnated in the applicator noses 30 of the porous compact 7, when the lubricant stored in the reservoir section 31 of the porous compact 7 is fed or led under pumping effect through the connector sections and then applicator noses 30 into the exposed surfaces 33. These exposed surfaces 33 are exposed to the turnaround passages 15 through the openings 25 in the end cap major part 5, but retracted back below the level of the edges 53 to guide the balls 10 lying around the openings 25 made in the outside curved wall portions 28 of the turnaround passages 15.

Figure 10:
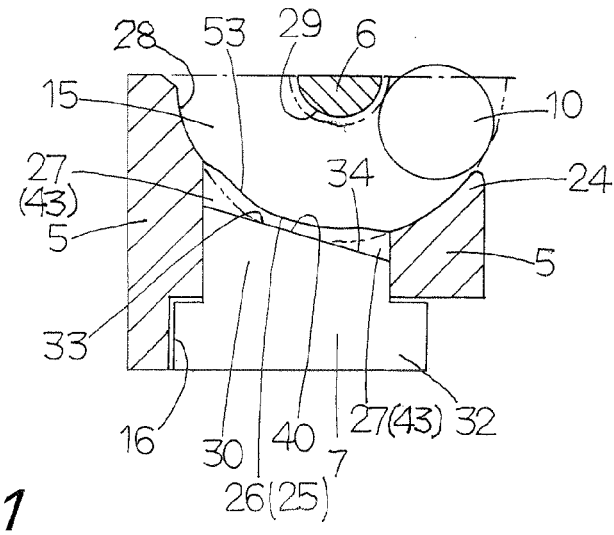
FIG. 10 is a view in section taken on the plane of the line 10-10 of FIG. 9 to explain how a ball comes into rolling contact with a porous compact along the opening in the end cap major part.

With the linear motion guide unit constructed as stated earlier, the balls 10 roll through the turnaround passages 15 while changing their rolling-contact locations with the turnaround passages 15 as shown in FIG. 10. More particularly, the balls 10 just before the openings 25 in the outside curved wall portions 28 of the turnaround passages 15 each roll through the turnaround passages 15, with keeping one-point rolling contact or non-contact with the outside curved wall portions 28 under the influence of a centrifugal force to depict each simple line of loci of a rolling contact point with the outside curved halves 28 of the turnaround passages 15. Then, the balls 10 after having moved past ingress sides of the ends of the openings 25 each roll through the turnaround passages 15, keeping rolling contact at two points with the edges 53 of the openings 25. That is, the balls 10, after having reached the openings 25 while rolling through the turnaround passages 15, are guided with keeping rolling contact at two locations with the edges 53 of the openings 25. Thus, the locus of the rolling-contact points of the balls 10 with the outside curved wall portions 28 changes or varies in conformity with the shape of edges of the openings 25. Meanwhile, the balls 10 come into rolling contact with the exposed surfaces 33 of the porous compact 7 at the middle areas of the openings 25. While the balls 10 roll with keeping rolling contact with the exposed surfaces 33 of the porous compact 7, the locus of contact location of the balls 10 with the exposed surfaces 33 of the porous compact 7 becomes each simple line lying midway between the ends of the slots 26 of the openings 25. Subsequently, the balls 10 while rolling through the turnaround passages 15 again come into rolling contact at two locations with the edges 53 of the openings 25 and then get away from the exposed surfaces 33 of the porous compact 7. Although any difference or gap would exist at boundary locations between the openings 25 and porous compact 7 depending on changes of the rolling-contact locations of the balls 10 with the exposed surfaces 33 as the balls 10 roll through the turnaround passages 15, no difference interferes with the smooth rolling of the balls 10 because the edges 53 of the slots 26 in the end cap major part 5 help guide the balls 10.

The porous compact 7 is exposed to the turnaround passages 15 in a fashion receding below the edges 53 of the slots 26 made in the walls of the outside curved wall portions 28 of the turnaround passages 15. The balls 10, after having rolled through the load-carrying races 17 or the return passages 20, turn round in the turnaround passages 15 of arced shape and roll along the outside curved wall portions 28 of the turnaround passages 15 under the influence of centrifugal force and impact exerted by other balls 10, thereby reaching at least one of the edges 53 of the openings 25 in the outside curved wall portions 28 of the turnaround passages 15, where the balls 10 are brought into rolling contact with the exposed surfaces 33 of the porous compact 7 and the lubricant is applied. The contact area 40 across which the ball 10 makes rolling contact with the exposed surface 33 has an elongated elliptic contour as shown in FIG. 11. The ellipse defining the contact area 40 has, for example a major diameter of from about 0.24 mm to about 0.95 mm in the rolling direction of the balls 10, which corresponds to from about 30% to about 120% of the diameter of the balls, and a minor diameter of from about 0.01 mm to about 0.19 mm, which corresponds to from about 1% to about 20% of the diameter of the balls. An angular range in which the balls 10 roll in the turnaround passages 15 corresponds to from about 11.8° to 47.4°.

Figure 1:
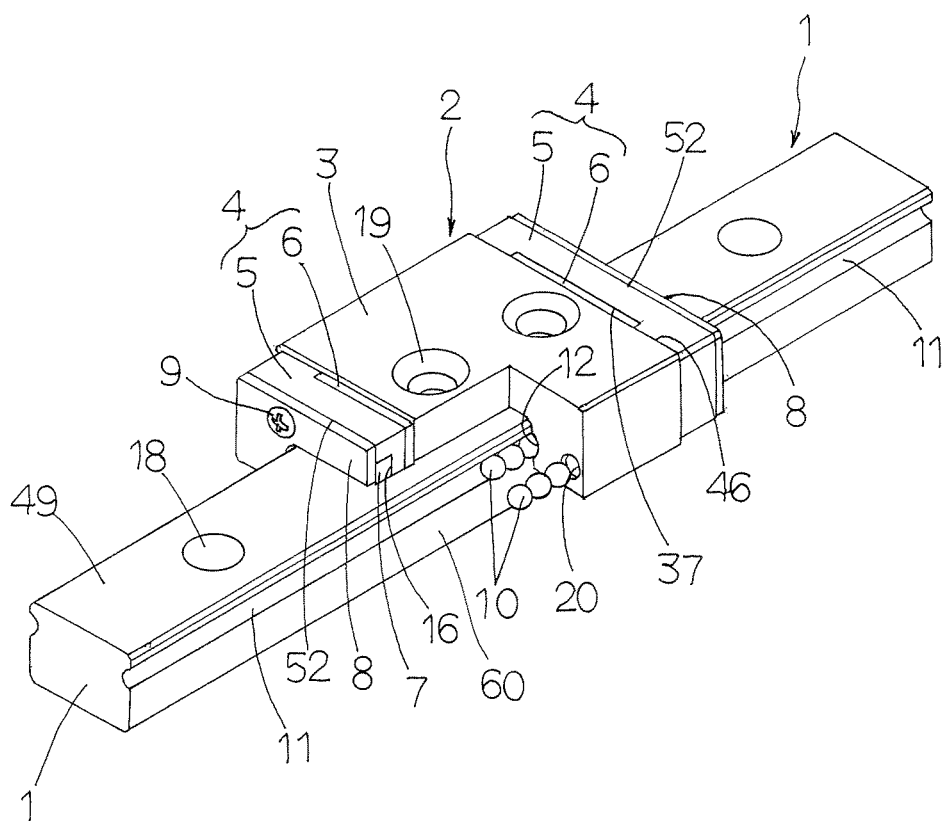
FIG. 1 is a partially cutaway view in perspective showing a preferred embodiment of a linear motion guide unit according to the present invention.
Figure 2:
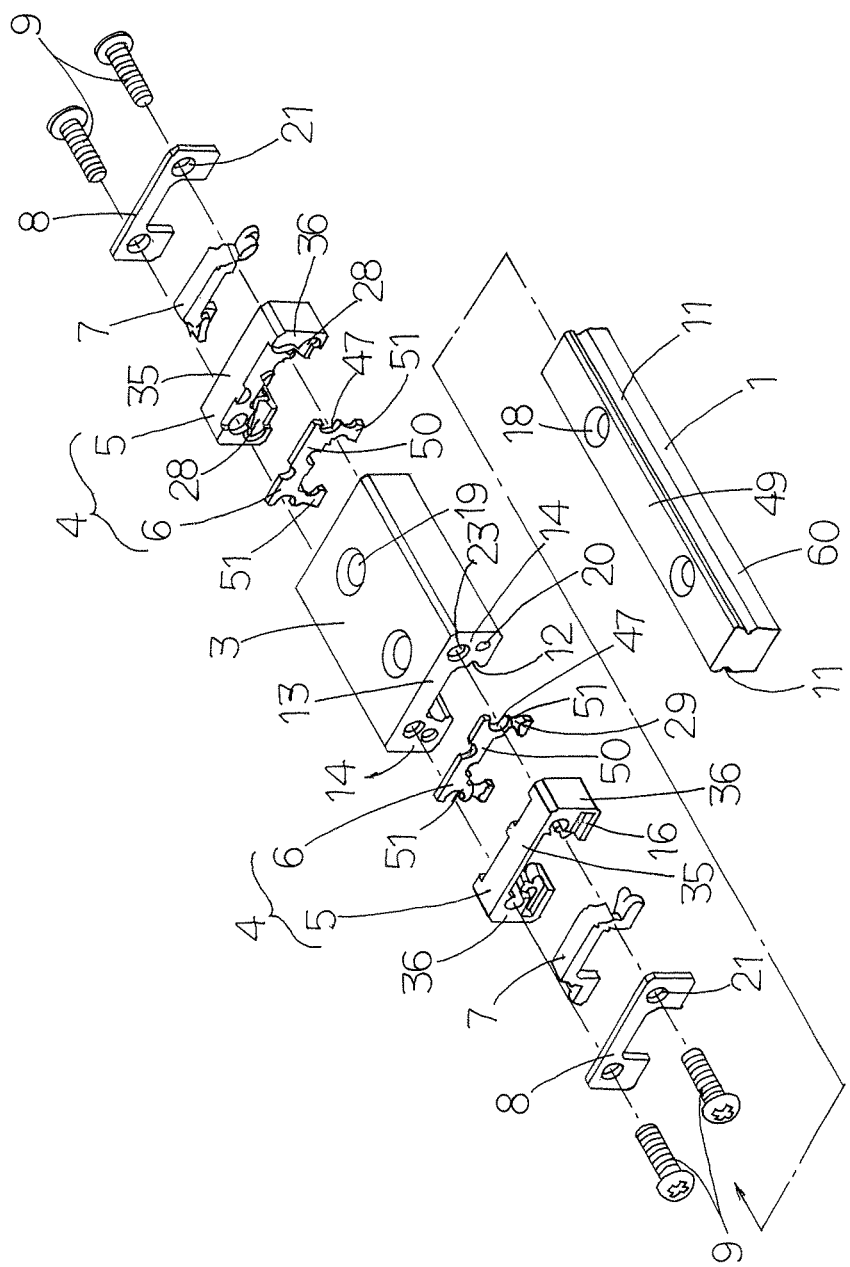
FIG. 2 is an exploded view in perspective of the linear motion guide unit of FIG. 1.
Figure 3:
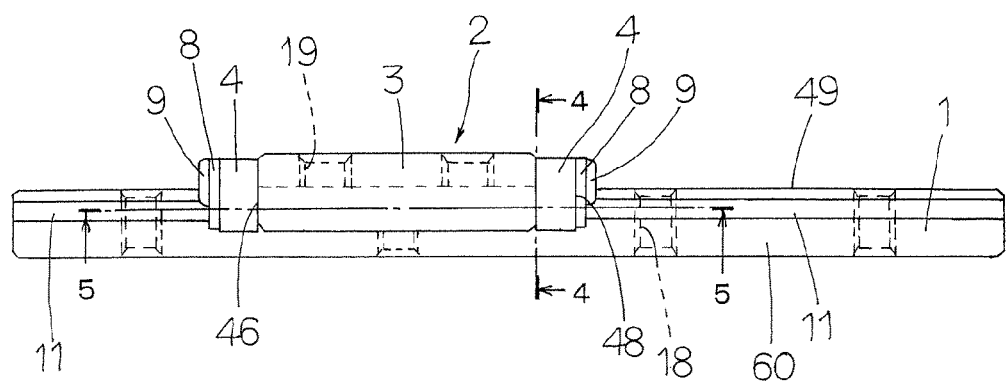
FIG. 3 is a view in side elevation of the linear motion guide unit of FIG. 1.
Figure 4:
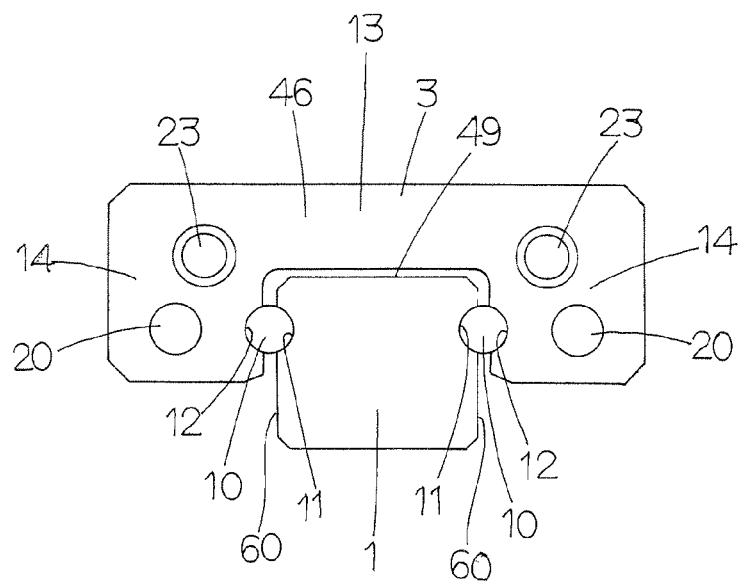
FIG. 4 is a view in end elevation of a carriage in the linear motion guide unit, the view being taken on the plane of the line 4-4 of FIG. 3.
Figure 5:
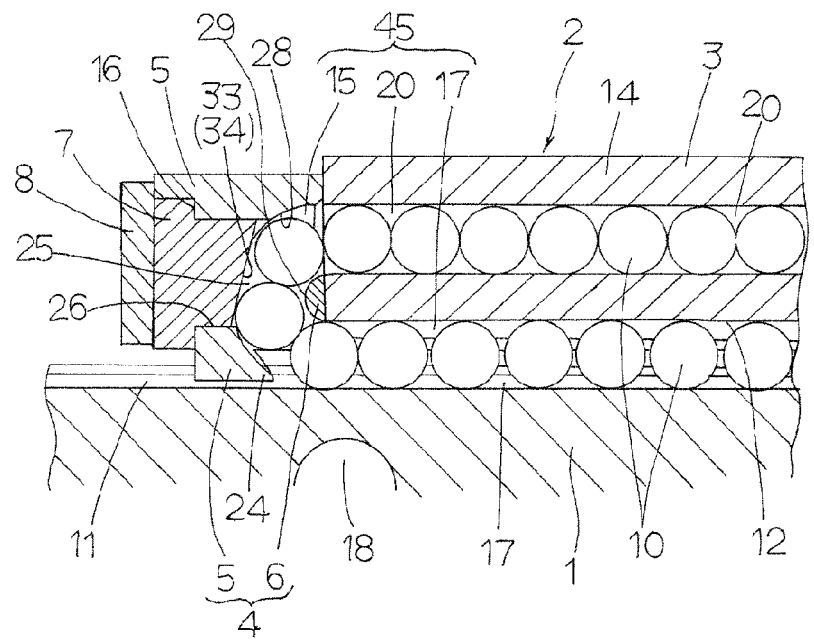
FIG. 5 is an enlarged fragmentary illustration showing a circulating circuit in the linear motion guide unit, the view being taken on the plane of the line 5-5 of FIG. 3.
Figure 6:
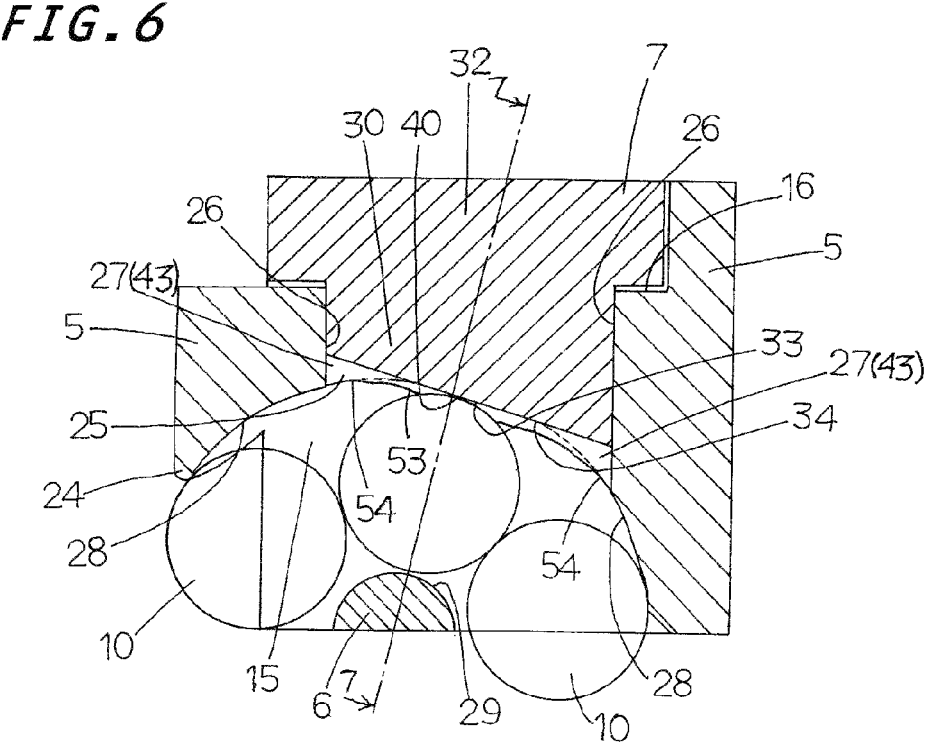
FIG. 6 is an enlarged fragmentary view in section showing an end cap having turnaround passages therein of FIG. 5.
Figure 7:
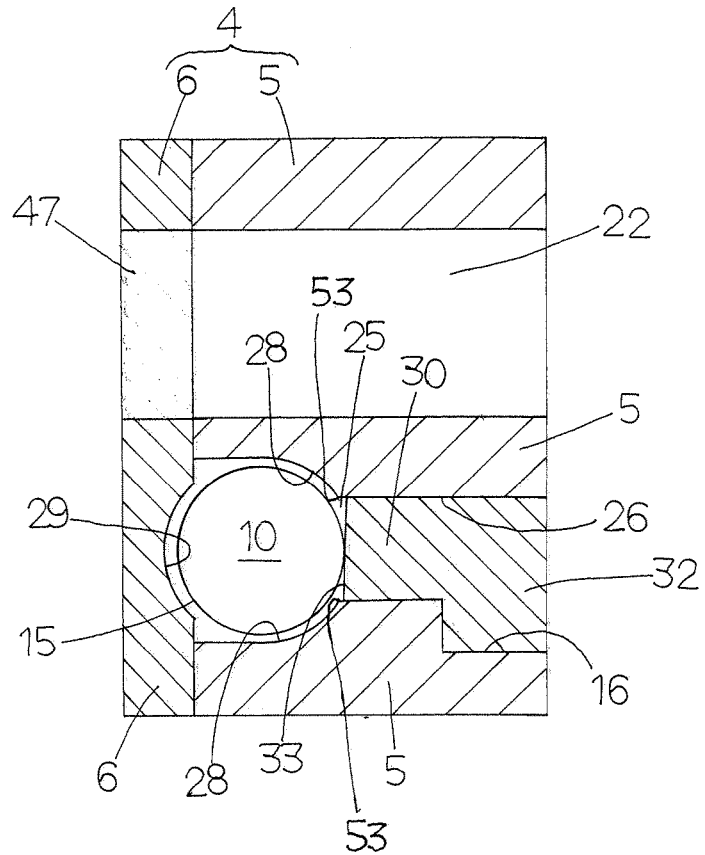
FIG. 7 is a view in section showing the end cap having the turnaround passages therein, the view being taken on the plane of the line 7-7 of FIG. 6.
Figure 8:
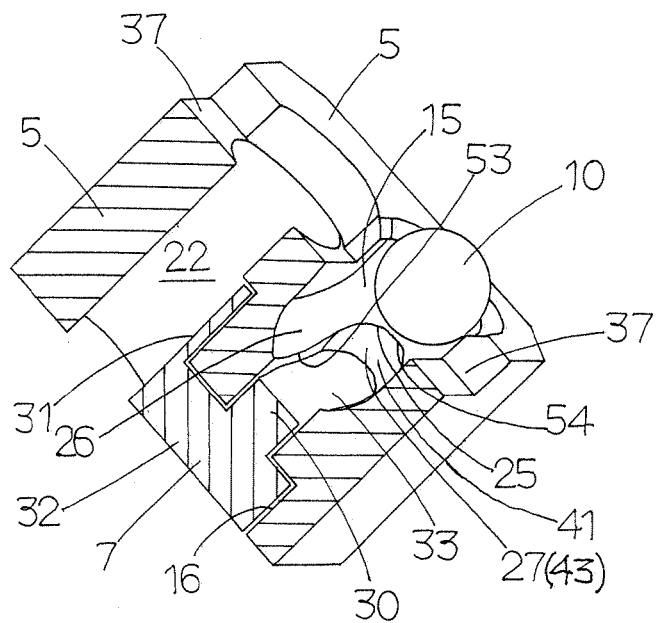
FIG. 8 is an enlarged perspective view in section showing an end cap having turnaround passages therein, the view being taken on the plane of the line 7-7 of FIG. 6 as in FIG. 7.
Figure 9:
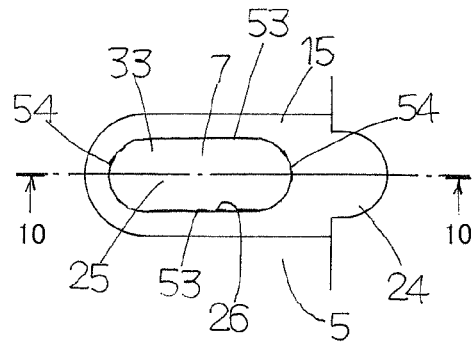
FIG. 9 is an explanatory view of an opening formed in an outside curved portion of the turnaround passage inside an end cap major part.

With the linear motion guide unit of the present invention, the openings 25 to the turnaround passages 15 are each as shown in FIG. 6 formed in such a relation that the middle of the opening 25 is biased or closer to the return passage 15 with respect to the arc of the turnaround passage 15. More especially, the middle of the opening 25 is biased or closer to the return passage 15 by a matter of 0.35 mm in the widthwise direction normal to the sliding direction of the slider with respect to the center of the arc of the turnaround passage 15. As a result of the geometry of the opening 25 as stated just earlier, edges 24 to scoop the balls 10 out of the load-carrying race 17 may be made thicker to ensure more mechanical strength and, moreover, the exposed surfaces 33 of the porous compact 7 may be relieved from any impact caused by the balls 10 which enter the turnaround passages 15 to roll along the outside curved wall portions 28 of the turnaround passages 15.

With the linear motion guide unit constructed as stated earlier, the applicator noses 30 of the porous compact 7 are formed in, for example contours as shown in FIGS. 23 to 27, in which (A) shows a sectional view taken at a location of the turnaround passage 15 in the end cap 4 and viewed from the upper side of the slider 2, and (B) is a sectional view taken on the plane lying on the middle line of the turnaround passage 15. The exposed surface 33 of the porous compact 7 is retracted below the slot 26 of the opening 25 in the outside curved wall portion 28 of the turnaround passage 15. Moreover, the middle of the turnaround passage 15 is an exact match with the middle of the slot 26 in the outside curved wall portion 28 of the turnaround passage 15 in the widthwise direction of the slider perpendicular to sliding direction. With the linear motion guide unit of the present invention, the exposed surface 33 of the leading edge 42 of the applicator nose 30 is made in any of a flat surface, more than two flat surfaces or a curved surface. As an alternative, the exposed surface 33 may be made slanted or inclined as shown in FIG. 6. The exposed surface 33 is, for example an incline of 16 degrees with respect to the end 46 of the carriage 3 crossing at right angles to the sliding direction of the slider 2. More especially, the exposed surface 33 is askew to approach closer the end 46 of the carriage 3 in the side of the return passage 20 rather than in the side of the load-carrying race 17.

FIG. 23(A) is a sectional view to show the exposed surface 33 of the porous compact 7, which is made slanted in the widthwise direction of the slider 2 to provide an incline 34. FIG. 23(B) is a sectional view taken on the plane of line 23(B)-23(B) of FIG. 23(A) lying on the middle of the turnaround passage 15 to show the contour of the contact area 40 on the exposed surface 33 of the porous compact 7.

FIG. 24(A) is a sectional view showing the exposed surface 33 of the porous compact 7 made in a level 56 which is flat in the widthwise direction of the slider 2. FIG. 24(B) is a sectional view taken on the plane of line 24(B)-24(B) of FIG. 24(A) lying on the middle of the turnaround passage 15 to show the contour of the contact area 40 on the exposed surface 33 of the porous compact 7.

FIG. 25(A) is a sectional view showing the exposed surface 33 of the porous compact 7 made in a raised level 57 in the widthwise direction of the slider 2. FIG. 25(B) is a sectional view taken on the plane of line 25(B)-25(B) of FIG. 25(A) lying on the middle of the turnaround passage 15 to show the contour of the contact area 40 on the exposed surface 33 of the porous compact 7. In the version shown in FIG. 25(A) and FIG. 25(B), more especially, the exposed surface 33 of the porous compact 7 is raised at the contact area 40 with the ball 10.

FIG. 26(A) is a sectional view showing the exposed surface of the porous compact made in a concaved surface 58 in the widthwise direction of the slider 2. FIG. 26(B) is a sectional view taken on the plane of line 26(B)-26(B) of FIG. 26(A) lying on the middle of the turnaround passage 15 to show the flat contour of the contact area 40 on the exposed surface 33 of the porous compact 7. In this version, the exposed surface 33 on the porous compact 7 has a radial dimension larger than a radial dimension of the curved surface at the outermost location of the turnaround passage 15.

FIG. 27(A) is a sectional view showing the exposed surface 33 of the porous compact 7 made in an annular curved surface 59 of doughnut shape in the sliding direction of the slider 2. FIG. 27(B) is a sectional view taken on the plane of line 27(B)-27(B) of FIG. 27(A) lying on the middle of the turnaround passage 15 to show the annular contour of the contact area 40 on the exposed surface 33 of the porous compact 7. In this version, the exposed surface 33 on the porous compact 7 has a radial dimension larger than a radial dimension of the curved surface at the outermost location of the turnaround passage 15. Unlike the versions recited earlier, the exposed surface 33 of the porous compact 7 has at least one flat or curved contour retracted below the opening 25 in the outside curved wall portion 28 of the turnaround passage 15. As an alternative, the exposed surface 33 of the porous compact 7 may be made to either expose itself through the opening 25, having the curvature conforming to the curvature of the curved surface of the turnaround passage 15 or slightly rise into the turnaround passage.

What is claimed is:

1. A linear motion guide unit comprising:
an elongated guide rail having on both sides thereof first raceway grooves extending in a longitudinal direction of the guide rail, and a slider that fits over or conforms to the guide rail to move in the longitudinal direction of the elongated guide rail in a sliding manner,
the slider being composed of a carriage and end caps, the carriage having second raceway grooves extending in opposition to the first raceway grooves on the guide rail to provide load-carrying races between the first and second raceway grooves and return passages extending along the load-carrying races, the end caps being fastened on end surfaces opposed in the longitudinal direction of the carriage, one to each end surface, and provided therein with turnaround passages extending with curvature to connect the load-carrying races with the return passages, and
the slider including a plurality of balls, which are allowed to roll through circulating circuits made up of the load-carrying races, return passages and the turnaround passages, and porous compacts impregnated with lubricant and stowed in concavities recessed below end surfaces of the end caps in a sliding direction of the slider,
wherein each of the turnaround passages on outside curved wall portions thereof have a slot connecting the concavities in the end caps to the turnaround passages, the slots being each elongated in a rolling direction of the ball and rounded at lengthwise opposite ends thereof, each of the porous compacts having an applicator nose extending through the respective slot to provide end surfaces exposed to the turnaround passages, and the balls while rolling through the turnaround passages being guided along the slots to make rolling contact with the exposed surfaces of the porous compacts to be applied with the lubricant impregnated in the porous compacts, wherein the exposed surfaces of the applicator noses are each set back below the opposite ends of the respective slot and edges which extend in parallel with each other to connect the opposite ends of the slot to each other, so that spherical surfaces of the balls, while rolling along the outside curved wall portions of the turnaround passages, protrude in part through an interval between the edges of the respective slot to come into rolling contact with the exposed surfaces, and wherein the balls, while protruding in part through the interval between the edges of the respective slot, come into at least one-point contact with the contact areas of the exposed surface midway between the opposite ends of the respective slot.

2. A linear motion guide unit constructed as defined in claim 1, wherein the end caps are each composed of an end cap major part defining the outside curved wall portions of the turnaround passages and a spacer part defining an inside curved wall portions of the turnaround passages, the end cap major part comprising the concavity in which the porous compact is installed and the slots into which the applicator noses of the porous compact fit.

3. A linear motion guide unit constructed as defined in claim 2, wherein a plurality of protrusions are raised above a front and/or a rear surface of the porous compact in the moving direction of the slider, these protrusions, after the porous compact has fitted and fastened in the concavity in the end cap major part, being squeezed inside the concavity to suffer deformation, thereby keeping the porous compact against rattling and/or straying relative to the end cap major part.

4. A linear motion guide unit constructed as defined in claim 1, wherein pockets serving as oil reservoirs are each defined with a combination of the exposed surface of the applicator nose and a wall surface of the slot at vicinities of the opposite ends of the slot through which the porous compact is exposed to the turnaround passage.

5. A linear motion guide unit constructed as defined in claim 1, wherein the exposed surfaces of the applicator noses of the porous compact extend aslant with respect to the rolling direction of the balls, thereby tilting to more approach the ends of the carriage on a side of the return passages than on a side of the load-carrying races.

6. A linear motion guide unit constructed as defined in claim 1, wherein the porous compact fits into the concavity in the end cap, exposing itself to at least the top surface of the guide rail.

7. A linear motion guide unit constructed as defined in claim 1, wherein the porous compact is made of synthetic resin of any one of polyethylene and polypropylene.

8. A linear motion guide unit constructed as defined in claim 7, wherein the synthetic resin is compacted under pressure together with the application of heat, the resulting sintered resinous member having open-porous texture in which pores are open to each other through interstices among resinous particles, and wherein the lubricant fills in the pores.

9. A linear motion guide unit comprising:

an elongated guide rail having on both sides thereof first raceway grooves extending in a longitudinal direction of the guide rail, and a slider that fits over or conforms to the guide rail to move in the longitudinal direction of the elongated guide rail in a sliding manner, the slider being composed of a carriage and end caps, the carriage having second raceway grooves extending in opposition to the first raceway grooves on the guide rail to provide load-carrying races between the first and second raceway grooves and return passages extending along the load-carrying races, the end caps being fastened on end surfaces opposed in the longitudinal direction of the carriage, one to each end surface, and provided therein with turnaround passages extending with curvature to connect the load-carrying races with the return passages, and the slider including a plurality of balls, which are allowed to roll through circulating circuits made up of the load-carrying races, return passages and the turnaround passages, and porous compacts impregnated with lubricant and stowed in concavities recessed below end surfaces of the end caps in a sliding direction of the slider, wherein each of the turnaround passages on outside curved wall portions thereof have a slot connecting the concavities in the end caps to the turnaround passages, the slots being each elongated in a rolling direction of the ball and rounded at lengthwise opposite ends thereof, each of the porous compacts having an applicator nose extending through the respective slot to provide end surfaces exposed to the turnaround passages, and the balls while rolling through the turnaround passages being guided along the slots to make rolling contact with the exposed surfaces of the porous compacts to be applied with the lubricant impregnated in the porous compacts, wherein the end caps are each composed of an end cap major part defining the outside curved wall portions of the turnaround passages and a spacer part defining an inside curved wall portions of the turnaround passages, the end cap major part comprising the concavity in which the porous compact is installed and the slots into which the applicator noses of the porous compact fit, and wherein a plurality of protrusions are raised above a front and/or a rear surface of the porous compact in the moving direction of the slider, these protrusions, after the porous compact has fitted and fastened in the concavity in the end cap major part, being squeezed inside the concavity to suffer deformation, thereby keeping the porous compact against rattling and/or straying relative to the end cap major part.

\* \* \* \* \*